(12) United States Patent
Achacoso et al.

(10) Patent No.: US 6,772,229 B1
(45) Date of Patent: *Aug. 3, 2004

(54) CENTRIFUGAL COMMUNICATION AND COLLABORATION METHOD

(75) Inventors: Theodore B. Achacoso, Washington, DC (US); D. Wayne Silby, Washington, DC (US)

(73) Assignee: GroupServe, Inc., Arlington, VA (US)

( * ) Notice: Subject to any disclaimer, the term of this patent is extended or adjusted under 35 U.S.C. 154(b) by 628 days.

This patent is subject to a terminal disclaimer.

(21) Appl. No.: 09/709,441

(22) Filed: Nov. 13, 2000

(51) Int. Cl.[7] .............................................. G06F 3/00
(52) U.S. Cl. .......................... 710/4; 709/203; 709/204; 709/206; 711/164; 713/202
(58) Field of Search ................................. 709/213, 203, 709/204, 206; 711/164; 345/751, 753

(56) References Cited

U.S. PATENT DOCUMENTS

| | | |
|---|---|---|
| 5,144,557 A | 9/1992 | Wang et al. |
| 5,293,250 A | 3/1994 | Okumura et al. |
| 5,418,908 A | 5/1995 | Keller et al. |
| 5,548,753 A | 8/1996 | Linstead et al. |
| 5,632,018 A | 5/1997 | Otorii .......................... 709/200 |

(List continued on next page.)

FOREIGN PATENT DOCUMENTS

| | | |
|---|---|---|
| EP | 0 561 649 | 9/1993 |
| EP | 0 736 989 | 4/1996 |
| EP | 0 785 661 | 1/1997 |
| GB | 2 272 349 | 5/1994 |
| JP | 04138741 | 5/1992 |
| JP | 06069952 | 3/1994 |
| JP | 07210476 | 8/1995 |
| JP | 08237297 | 9/1996 |
| WO | 0 739 115 | 10/1996 |
| WO | 0 798 899 | 10/1997 |
| WO | WO 98/00787 | 1/1998 |

OTHER PUBLICATIONS

"Delphi's Custom Forum," http://www.customforum.com/features.html, p. 1.
"Ceilidh's Lilikoi Forum," http://www.lilikoi.com/features.html, pp. 5–6.
"Source: Installation: Hypernews Gateway to Email," http://www.hypernews.org/HyperNews/get/hypernews/email.html, pp. 1–2.

(List continued on next page.)

*Primary Examiner*—Cao (Kevin) Nguyen
*Assistant Examiner*—Blair Basom
(74) *Attorney, Agent, or Firm*—Venable LLP; Michael A. Gollin; Jeffrey W. Gluck

(57) ABSTRACT

A system for communicating information among participants in a distributed application having peripheral communications devices comprises a central agent having two-way links to the peripheral devices, a notice generator triggered by an information input from one participant directed to at least one other participant, the notice generator generating a notice for the other participant(s) and pushing the notice to the peripheral device of the other participant(s) only if the information input was directed to the other participant(s), a central storage medium storing the information input, and an access channel by which the other participant(s) may receive the information input only if the other participant(s) responds to the notice. The links may form a computer network, cable network, telecommunications network, wireless network, or other network, or a combination. Additional information inputs may be associated with the first information input or may modify or delete it.

55 Claims, 7 Drawing Sheets

U.S. PATENT DOCUMENTS

| | | | | |
|---|---|---|---|---|
| 5,675,507 A | 10/1997 | Bobo, II | | 709/206 |
| 5,694,546 A | 12/1997 | Reisman | | 705/26 |
| 5,790,790 A | 8/1998 | Smith et al. | | 709/206 |
| 5,790,793 A | 8/1998 | Higley | | 709/218 |
| 5,796,393 A | 8/1998 | MacNaughton et al. | | 345/329 |
| 5,813,007 A | 9/1998 | Nielsen | | 707/10 |
| 5,842,216 A | 11/1998 | Anderson et al. | | 707/203 |
| 5,892,909 A | 4/1999 | Grasso et al. | | 709/201 |
| 5,893,114 A | 4/1999 | Hashimoto et al. | | 707/200 |
| 5,930,471 A | 7/1999 | Milewski et al. | | 709/204 |

OTHER PUBLICATIONS

"Microsoft® BackOffice™ Building Exchange™ and Outlook™ Solutions," http://www.microsoft.com/exchange/...yment/collabsolutions.htm™Building, pp. 1–2.

Lotus Institute, "Supporting Teams with Collaborative Technology," http://www.2.lotus.com/insititute.ns, pp. 1–3.

Lotus Institute, "Lotus TeamRoom," http://www.2.lotus.com/institute.ns, pp. 1–2.

"Announcing CREW™," file:///A|/CREWINTR,HTM, pp. 1–2.

"The New Way to Share Workgroup Information," file:///A|/NETSCA~2.HTM, pp. 1–5.

PointCase Network, "the most exciting way to get your news," http://www.pointcast.com/whatis_fromhome.html, pp. 1–2.

Wayfarer, "INCISA™—Bridging the Gap," http://www.wayfarer.com/products/default.htm, pp. 1–2.

Siviter, D., Petre, M., and Klein, B., "Harnessing Technology for Effective Inter– and Intra–institutional Collaboration: Report of the ITiCSE'97 Working Group on Supporting, Inter– and Intra–institutional Collaboration," Working Group Reports and Supplemental Proceedings, Aug. 1997, pp. 70–93.

"Groupware—Communications, Collaboration, Coordination," Groupware, 1997, pp. 1–41.

"What is HyperNews?: A Brief Overview", http://web.archive.org/web/1997010411427/http://union.ncsa.uiuc.edu/HyperNews/get/hypernews/about.html, pp. 1–4.

"Source: History of HyperNews", http://www.hypernews.org/HyperNews/get/hypernews/history.html, pp. 1–13.

"HyperNews: Source: Installation: Email Gateway", http://www.hypernews.org/HyperNews/get/hypernews/email.html, pp. 1–15.

"Conferencing on the Web", http://www.thinkofit.com/webconf/wcunleash.htm, pp. 1–12.

"Supporting Collaboraive Information Sharing with the World Wide Web: The BSCW Shared Workspace System", http://bscw.gmd.de/Papaers/WWW4–Boston/WWW4–Boston.html, pp. 1–11.

"Basic Support for Cooperative Work on the World Wide Web", http://bscw.gmd.de/Papers/IJHSC/IJHCS.html, pp. 1–20.

"net.Thread 96: Product Information", http://web.archive.org/web19961222210244/www.eshare.com/eshare/net_thread/cell3.html, pp. 1–4.

"GroupMaster: The easy email list manager", http://www.meridian–marketing.com/REVNET/gmdetailmain.html, pp. 1–5.

"Spectrum: Interactive Media & Online Developer News (Oct. 6, 1997)", http://www.3dlinks.com/spectrum/issues/spectrum–oct–06–97.cfm, pp. 1–2.

"Tech Direct's Internet Strategist: Mailing List Tools", http://www.techdirect.com/stragegy/mltech.html, pp. 1–4.

"GroupMaster free download. A web–based email list management system.", http://www.freedownloadcenter.com/Network_and_Internet/Mail_Server_Tools/GroupMaster.html, pp. 1–2.

"MHonArc v2.5: Introduction", http://www.mhonarc.org/MHonArc/doc/intro.html, pp. 1–2.

"MHonArc v2.5: Quick Start", http://www.mhonarc.org/MHonArc/doc/quickstart.html, pp. 1–2.

"sixdegress—my bulletin board", http://web.archive.org/web/19980416103158sixdegrees.com/About/mybulletinboard.cfm?PF=166181270631, pp. 1–6.

"Communityware upgraded with new interface and additional features", http:www.durand.com/press/pr_cwfeatures.htm, pp. 1–2.

"Community Internet Servies; Group Services Options", http://web.archive.org/web/19961101031233/cois.com/group/grp_opts.html, pp. 1–2.

"Nicenet's Internet Classroom Assistant", http://webarchive.org/web/1999012507247/129.105.114.23/, pp. 1–2.

"Infopop: About the Company"; http://www.infopop.com/aboutus/, pp. 1–4.

"SamePage Datasheet", http://webarchive.org/web/19980424091751/http://www.accentate.com/samepage/products/DSsp.html, pp. 1–3.

"Accentuate Systems, Inc.: Product: TakeAction!", http://www.accentuate.com/takeaction.html, pp. 1–3.

"Lyris: Email List Serves", http://web.archiv.org/web/19980109173254/lyris.com/features/mail/index.html, pp. 1–4.

"Proxicom J/Forum", http://web.archive.org/web/19971212053118/www.proxicom.com/products/jforum/, pp. 1–3.

"Allaire Forums 2.0 Offers Dynamic New Features for High–Performance Web Conferencing and Threaded Discussions", http://web.archive.org/web/19970618234847/www.allair.com/project/interfaces/getviewer.dbm?dt=one&WebResource_354, pp. 1–2.

"3D_Floyd", http://web.archive.org/web/19971221092805/greenspun.com/bboard/q–and–a.tcl?topic=3D_Floyd, pp. 1. and "Add an Alert", http://web.archive.org/web/20030117161532/http://greenspun.com/bboard/add–alert-.tcl?topic=3D_Floyd, pp. 1

Fritsch, Mirjam, "Platforms for Virtual Seminars," ZIFF, Nov. 1997.

Hunt, Russel A., "Affordances and Constraints of Electronic Discussions," first presented at 13th Inkshed Working Conference, May 1996: last revised Jun. 17, 1999.

"Collaboration with Hypernews", http://web.archive.org/web/199701041813..uc.edu/~liberte/hypernews/overview.html, pp. 1–3.

"HyperNews: Instructions: Email Subscribing and Unsubscribing:", http://www.hypernews.org/HyperNews/get/hypernews/subscribing.html, pp. 1–3.

"Other ways to subscribe and depth ideas", http://www.hypernews.org/HyperNews/get/hypernews/email/10/3/html, pp. 1–2.

"Applications of a HyperNews–Mail Gateway", http://www.hypernews.org/HyperNews/get/hypernews/email/14/1.html, pp. 1.

"Subscribe to be notified by email", http://www.hypernews.org/HyperNews/get/hypernews/subscribing/4/1.html, pp. 1.

"Email notificaiton of postings without content?", http://www.hypernews.org/HyperNews/gehypernews/subscribing/25.html, pp. 1.

"Unsubscribe or don't subscribe", http://www.hypernews.org/HyperNews/get/hypernews/subscribing/54/1.html, pp. 1.

"Some member and subscription details.", http://www.hypernews.org/HyperNews/get/hypernews/about/56/1.html, pp. 1, "Subscribe or Unsubscribe", http://www.hypernews.org/HyperNews/edit–subscribe.pl/hypernews/test.html, pp. 1–2.

"Instructions for Using HyperNews 1.9," http://www.dranonymous.com/hn/instructions.html, pp. 1–9.

US 6,772,229 B1

CENTRIFUGAL COMMUNICATION AND COLLABORATION METHOD

CROSS-REFERENCE TO RELATED APPLICATION

This application is a continuation-in-part of U.S. patent application Ser. No. 09/041,599, filed Mar. 13, 1998, commonly assigned, and incorporated herein by reference in its entirety.

FIELD OF THE INVENTION

This invention relates to communication and collaboration tools that allow groups to share information across time and space using computer and other communication channels. The inventive method may be incorporated into the design of products such as groupware software and communications services.

BACKGROUND OF THE INVENTION

The conventional approach to the design of communication and collaboration products, especially of groupware, is a centripetal method, i.e., group members are required to go to a central area in order to retrieve and exchange data and information. For example, in the Internet, group members need to converge on a server in order to communicate and collaborate.

The previous approaches taken in this field can be categorized in two different product groups:

(1) Centripetal method: Examples of the use of this method include: IBM's Lotus Notes and Domino; Microsoft's Exchange and NetMeeting; Netscape's Virtual Office by Concentric; Radnet's Webshare; Novell's GroupWise; Thuridion's Crew; IntraACTIVE's In Tandem; Linkstar's HotOffice; Changepoint's Involv; Internet Media Inc.'s 3-2-1 Intranet; and others. All of these products require group members to remember to go to a central area (a server) in order to retrieve and exchange data and information. This centripetal design leads producers to develop products by increasing the speed of connection and facilitating access to the central site of communication and collaboration. Using the client-server infrastructure, products are either proprietary servers, enhanced software clients, or both.

(2) Narrowcasting method: This method is exemplified in the following products: PointCast's Client and Server; Marimba's Castanet; Progressive Network's Real Clients and Servers; Microsoft's NetShow; Netscape's Browser and Media Server; Wayfarer's INCISA; and all listserve products. All of these products use the narrowcasting model of one-to-many communication. Group members (many) have to remember to "tune-in" or attend the narrowcasted content served by a central site (one), without knowing whether or not new or relevant information is there.

Both the centripetal and narrowcasting approaches suffer from the disadvantage that group members have to report and remember to report to a central area for communication and collaboration. While they have not failed as models, they have failed to anticipate problems associated with the information age, such as information glut and competition for attention. Prior art methods assume that value is added by improving the way group members go about retrieving information that updates at a central location. Collaborative value is stored in the central repository. Group members still must actively go to the central resource to get any information or value from the group. For example, in the Internet, a group member would need to remember to log into a server for a videoconferencing appointment at a designated time. It would be an improvement to such a system for appointments and reminders for appointments to be "pushed" to the group member's awareness via e-mail with a Web hyperlink to the videoconference, via a narrowcast of the appointment, or other technologies that drive the information outward to the group member.

In the digital era, the computer has increasingly become a substitute for physical presence and interaction. Designers, however, have focused on providing cheaper and quicker access and offering additional functionality such as manipulation of the data and information sought. In the attempt to mimic human interaction such as congregating in a town hall for a meeting (a centripetal method) via electronic means, the power of the electronic medium to conduct the meeting outside of the town hall has been ignored.

General Definitions

A "computer" refers to any apparatus that is capable of accepting a structured input, processing the structured input according to prescribed rules, and producing results of the processing as output. Examples of a computer include: a computer; a general-purpose computer; a supercomputer; a mainframe; a super mini-computer; a mini-computer; a workstation; a microcomputer; a server; an interactive television; a hybrid combination of a computer and an interactive television; and such devices as personal digital assistants (PDAs) and telephone systems that include microbrowsers. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections, like cables, or temporary connections, like those made through telephone or other communication links. Examples of a network include: an internet, such as the Internet; an intranet; a local area network (LAN); a wide area network (WAN); a cable network; a wireless network; a telephone network; and a combination of networks, such as an internet and an intranet.

An "information storage device" refers to an article of manufacture used to store information. An information storage device has different forms, for example, paper form and electronic form. In paper form, the information storage device includes paper printed with the information. In electronic form, the information storage device includes a computer-readable medium storing the information as software, for example, as data.

SUMMARY OF THE INVENTION

The invention, referred to in some of its aspects as a Centrifugal Communication and Collaboration Method (CCCM), reverses the established centralized design of communication and collaboration products, especially of groupware software. CCCM "pushes" out to participants in a distributed application the data and information contained in a conceptual or actual central area. This conceptual or actual central area may be located in a distinct location, or it may be distributed among computer apparatus located at the participants' sites. The centrifugal flow of CCCM is distinct from the current centripetal design of such products, and provides numerous advantages.

A centrifugal arrangement improves the ability of groups of participants to communicate, collaborate, exchange information, and to generally participate in distributed applications because of its focus on the individual participants rather than a central meeting site. CCCM creates value in interactive group-oriented software applications by distributing the accumulated group knowledge and activity to the individual participants, rather than forcing the participants to go to the central source of data and information where the wealth of the group is stored. Previous applications focused on better, cheaper, and faster ways to bring participants together in a central location. CCCM focuses on using the interactive capabilities of networks to maintain value among the participants, not only at a central repository of information and data.

The active, centrifugal delivery to participants of updated information relevant to the participants, such as the actions of other participants, the status of their pending group activities, the status of their requested information, etc., simplifies the process by which participants use software programs to gain and manipulate information over networks. Because the information is pushed, there is minimal need to converge at a central repository.

With CCCM, the dynamic is a centrifugal push, the opposite of the prior art centripetal model. The flow of information among participants in a distributed application using CCCM-enabled communication and collaboration software is outward in direction. CCCM takes the value of the central resource out to the individual users. The participants must converge at the centrifugal core (which, again, may physically be either centralized or distributed) only briefly. They are notified when they must do so, and their convergence is facilitated by shortcuts that make it easier to converge. Collaborative activity is moved away from the central core out through the network to the participant's peripheral location. For example, in an Internet-based embodiment, participants automatically receive from a server the data necessary to communicate and collaborate as a group.

CCCM is an integrative method. Using a computer network, it employs software code and servers to distribute content. In an internetworked environment, if group collaboration application software resides together with an HTTP server, then pushing out the group-generated information by e-mail employs a mail server, a network connection of all participants, and software code within the group collaboration software that calls on the mail server to push content. Or, if the group-generated information is distributed by narrowcasting, then a narrowcasting server is used, from which narrowcasting clients of participants receive information feed. The group collaboration software, through added software code, then communicates with the narrowcasting server to deliver group-generated information to participants.

As distinguished from other group-oriented software, CCCM reverses the basic assumption about how group value is created and information is shared. Rather than focusing on bringing participants into a central location in a better, cheaper, and faster way, CCCM empowers the participants by providing them information right where they are and leaves them to decide whether or not to go to the central site at all.

As distinguished from other uses of "push" technology, the content in CCCM is provided and continuously changed by the participants. The traditional push system is broadcasting, like television and radio. In this traditional model, preset content is sent to all viewers who have means to receive it, like television and radio sets. Viewers must be there at the same time as the broadcast to receive the content they want, or they must record it at the time of broadcast.

The general Internet model of push is narrowcasting. As with broadcasting, the source(s) of content are decided by the narrowcaster, and filtered according to the users' predetermined criteria as to what will be received.

In contrast, the content of CCCM that is continually being "pushed out" is not a standard collection of information selected by a central narrowcaster, but is a custom mix of information that remains in flux. The information that is pushed is created and continuously modified by the participants themselves. Messages and other information are unique to and generated by participants, and are determined by the role of each participant in the particular group application.

Rather than substitute an electronic model for the physical model of a meeting place, CCCM enhances the model of group interaction by taking advantage of the possibilities of virtual and digital communication and collaboration. While all other models took the previous "real world" example of a meeting hall, developed its cyberspace equivalent, then improved upon the cyberspace equivalent, CCCM uses the power of electronic methods to provide centrifugal flow that enhances the physical model.

CCCM removes the need for individuals to gather at a central location to find out what is there, what has changed since they were last there, and what they can do there. All group value no longer resides in the central resource. CCCM takes the dynamic group information from the center as it is changing with the contributions of its diverse participants and distributes it out to those participants.

In one embodiment of the invention, a system for communicating information among participants in a distributed application comprises:

for each participant, a peripheral device capable of transmitting and receiving information; and
a central agent comprising:
two-way links to the peripheral devices capable of receiving and transmitting information,
a notice generator,
a notice sender, and
a central storage medium able to store information inputs from participants,
the central storage medium storing a first information input from an inputting participant directed to at least one receiving participant; the notice generator, responsive to said first information input, being able to generate a notice selectively for the at least one receiving participant and to push the notice to the notice sender, the notice comprising a channel to a memory location of said first information input in the central storage medium; and the notice sender, responsive to the notice pushed from the notice generator, being able to send the notice selectively to the peripheral devices of the receiving participant; whereby the receiving participant can access said first information input directly using the channel in the pushed notice; the central storage medium being further able to store a second information input from a participant in response to said first information input and to associate it with said first information input while subsequently retaining said first information input or modifying or deleting said first information input in accordance with said second information input; the notice generator, responsive to said second information input, being able to generate a second notice selectively directed to at least one other participant in said distributed application, which at least one other participant may or may not include said inputting participant, the second notice comprising a channel to a memory location of said second information input in the central storage medium, and said second notice being pushed to said notice sender; said notice sender, responsive to said second notice being pushed, being capable of sending said second notice to the peripheral devices of the at least one participant to whom the second notice is selectively directed; and the central storage medium being further able to store a third information input from a participant in response to said second information input and associate it with said first and second information inputs while subsequently retaining said first and second information inputs or modifying or deleting one or both of said first and second information inputs in accordance with said third information input.

In some variations on this embodiment, each of the central agent and the central storage medium is physically either centralized or distributed, with components distributed among the participants' sites. In some embodiments in which the central storage medium is distributed, information stored in the various locations is synchronized.

The notice generator may push the notice immediately or at the end of a predetermined period, when all notices generated during the preceding period are pushed together. The notice preferably comprises at least a summary of the information input (but may include the entire information input), and a link to the information input on the central storage medium. The notice generator may push notices via e-mail, narrowcasting, or a combination. Access to the central agent preferably requires using a password and a user identification (userID), and information inputs and notices may be encrypted. The userID and password, and any other necessary access information, are included as part of the link. In a preferred embodiment, where a given participant is a participant in multiple distributed applications, a single channel is pushed as part of the notice, and the channel, when activated, links the participant to any information regarding any or all of the applications in which the participant participates.

The links may form a computer network, a cable network, a telecommunications network, a wireless network, a television network (cable or wireless), a radio network, or a combination. The central agent may reside as a program operating on at least one of a network server, an internet, an intranet, or it may reside, in a distributed fashion, on any or all of the participants' peripheral devices. The inputs are preferably retained in the central storage medium as a database archive for a predetermined period. The system may comprise a network server farm including a server selected from the group consisting of groupware, a video server, an audio server, a chat server, and a news server.

The central agent may comprise a database system, to which the links pushed to the participants bring the participants when they are activated; in some embodiments, the database system is a relational database system, an object-relational database system or a flat-file database system. The central agent, in turn, accesses the central storage medium to push the information out to the participants.

In one embodiment of the invention, different participants are granted different levels or privilege/access within the context of an application. In such a case, the central agent also implements, or includes means for, differentiating among such different levels of privilege/access and permitting only activities associated with such levels.

Different participants may use different peripheral devices, including PDAs, wireless telephones, personal computers, etc. In one embodiment of the invention, the central agent is capable of manipulating the information being sent to and received from each peripheral device, according to its capabilities. For example, some such devices may only have audio capability, some may have multi-media capability, some may have visual-only capability, and they may have different formats.

The first information input is typically directed to a plurality of other participants, and the second information input may be directed to the first participant, another participant, or a plurality of participants. A person may be allowed to join in as a participant by forming a link with the person, and inviting the person to join. Alternatively, the individual initiating the application may opt to make the application public and thus open to participation by any individual desiring to become a participant, without invitations; such applications may be publicized, including by advertisement. In another embodiment, individuals are invited to join only with authorization by some particular individual or individuals, who may be the initiating participant, his agent or agents, or other designated individuals.

In various embodiments of the invention, the distributed application may be, among other things, at least one of a distributed discussion group, a distributed scheduling application, a distributed contact management application, a distributed document management application, and a distributed project management application.

In another embodiment of the invention, a method of communicating information among participants in a distributed application having peripheral devices capable of transmitting and receiving information, comprises:

providing a central device capable of receiving information from the peripheral devices and transmitting information to the peripheral devices, linking the central device to the peripheral devices, responsive to a first information input transmitted from the peripheral device of a first participant directed to at least one other participant, centrally receiving and storing the first information input, associating the first information input with the at least one other participant, preparing a notice of the first information input for the at least one other participant, the notice comprising a channel to a memory location of the first information input, and sending the notice to the peripheral device of the at least one other participant only if the at least one other participant is one to whom the associated information input is directed, responsive to a second information input by the at least one other participant, in response to said notice, centrally receiving, storing, and associating the second information input with the first information input, while retaining the first information input or modifying or deleting the first information input in accordance with the second information input, preparing a second notice of the second information input directed to at least one other participant, which may or may not include said first participant, the second notice comprising a channel to a memory location of the second information input, and sending the notice to the peripheral device of the at least one other participant only if the at least one other participant is one to whom the associated information input is directed, and responsive to a third information input by the at least one other participant to whom said second notice was directed and in response to said second notice, centrally receiving, storing, and associating the third information input with the first and second information inputs, while retaining the first and second information inputs or modifying or deleting one or both of the first and second information inputs in accordance with the third information input, preparing a third notice of the third information input directed to at least one other participant, the third notice comprising a channel to a memory location of the third information input, and sending the third notice to the peripheral device of the at least one other participant only if the at least one other participant is one to whom the associated information input is directed.

In another embodiment, a computer readable medium comprises a program for carrying out the method according to the invention.

Further objectives and advantages will become apparent from a consideration of the description and drawings.

BRIEF DESCRIPTION OF THE DRAWINGS

The invention is better understood by reading the following detailed description with reference to the accompanying figures, in which like reference numerals refer to like elements throughout, and in which:

FIG. 3-A shows the flow of information from the initial input by member $P_1$. FIG. 3-B shows a response by member $P_2$ directed to member $P_1$. FIG. 3-C shows a response and comment by member $P_3$, directed to members $P_1$ and $P_2$.

FIG. 4-A shows the flow of information received at separate times from each of the members $P_1$–$P_3$. FIG. 4-B shows the flow of information periodically pushed to the members.

DETAILED DESCRIPTION OF THE PREFERRED EMBODIMENTS

Figure 1:
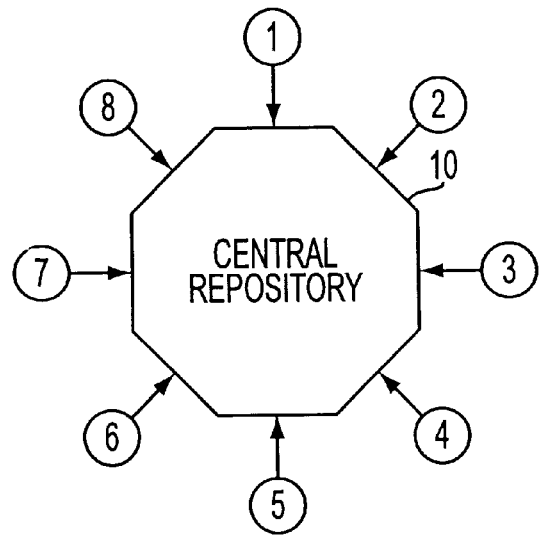
FIG. 1 illustrates a prior art model for centripetal communication and collaboration in a group.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

In a prior art example shown in FIG. 1-A, an eight-member group is depicted as circles 1–8, connected to central repository 10. Each user must converge on the central repository 10 to obtain information. If a member does not converge, the member has no access to information that is contained in central repository 10, has no knowledge of whether the information in repository 10 has been changed or updated, and has no way of knowing if any new information is relevant to that particular member. Convergence must be done on a "blind" basis, and is typically done periodically, such as every day or twice a day, whether needed or not. Central repository 10 is essentially a database, presenting all information and making it available in a standardized fashion to each member to access and review. The information may be filtered to the individual members, but it must all be stored centrally for such a system to operate effectively.

Figure 2:
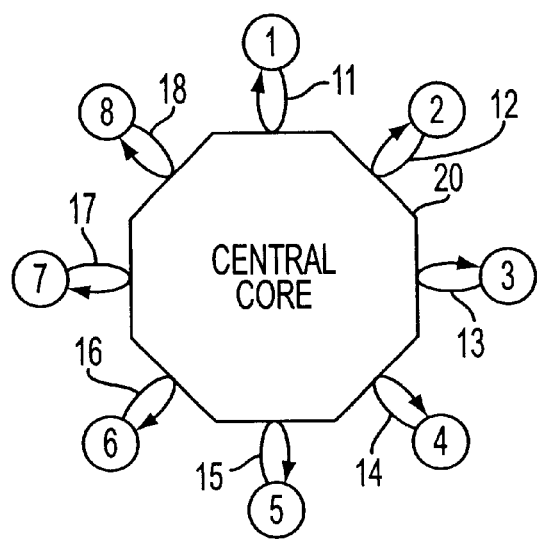
FIG. 2 illustrates the centrifugal communication and collaboration method of the invention.

In a schematic depiction of one embodiment of the invention, shown in FIG. 2, an eight member group is shown oriented around central core 20. Each member has a unique flow of information sent to and received from the central core 20, depicted as individual curved arrows 11–18. Members are notified when relevant information is posted at the central core 20, and may then retrieve the information knowingly. They need not converge blindly on the central core. In addition, because information is tailored and directed to individual members, the arrangement of information at the central core does not need to be a standardized database available to all members.

Preferred embodiments of the invention include the following.

(1) Multi-participant distributed software applications, enabled with CCCM by programmed code intended to push out group-generated information by e-mail, narrowcasting, and other such distribution methods. Examples of such applications include distributed discussion groups, scheduling, contact management, project management, etc. For example, a group discussion software implementation contains software code that allows discussion content to be e-mailed to the entire set or a subset of participants. An additional program may run at a predefined interval to notify participants of what content is new, what has been read and what has not, or whether or not they have been requested to respond to a particular comment. The individualized e-mail contains such notifications, as well as a mouse-clickable Web hyperlink to the content. The Web hyperlink may in itself open a videoconference, or the Web hyperlink may open a window that contains channelized connections not only to the discussion and videoconference, but also to the schedule and address book of the participant. Another example is a group scheduling software implementation linked to a narrowcasting system that activates a narrowcasting client. The narrowcasting client then narrowcasts, say, the events of the day or of the month, or that an appointment is about to become due, or that an Internet presentation is about to begin, or that someone has replied to a comment in a group discussion. Both e-mail and narrowcasting can be done using one or multiple media, such as text, audio, video, and images.

(2) CCCM can be used in non-computer-based networks, provided there is bi-directional exchange of information, including telecommunication systems, newer versions of cable-based networks, wireless networks, television networks, radio networks, and others. The invention does not much depend on how the network is linked. What is important is that each stored piece of information can be accessed via-a channel, for example, a URL, that can be used over the network and that this channel can be transmitted to participants so that they can use it to access the information.

Many variations are possible in the technology used to distribute centrifugally group-generated information. Distribution may occur by e-mail, by narrowcasting, and by other electronic means. According to the invention, there is no need for participants to converge at a central area, and the method is selective and deliberate as to what information is delivered. Participants need not remember to go to a central site for collaboration. CCCM makes participation more convenient than in prior-art methods and improves currently-existing communication and collaboration products, as well as those which may be developed in the future.

According to the invention, applications may be self-initiated. In other words, in an Internet embodiment, one person can identify e-mail addresses for a desired group of participants and set up the framework for a group application. The system pushes notices to the desired participants, as needed, with whatever URLs or other channels are necessary. The recipients, by clicking on the URLs or other channels, are brought to a central facility. In synchronous mode, the participants can communicate in streaming conversation and can scroll through messages. In asynchronous mode, the participants may participate and return at any time. If a participant has not returned for a predetermined time, a notice may be pushed to the participant (a) reminding him that a response is desired, (b) indicating that new information is available, or (c) providing a summary of recent activity.

Distributed applications may be set up with different types of access. In one embodiment, an application is set up such that any participant may invite a non-participant to join. In another embodiment, applications are made public, so that anyone may join (participants may even wish to encourage participation, for example, by advertising the application). In still another embodiment, participation may be at the discretion of one or more particular participants; for example, the participant(s) who initiated the application may retain control over who may join as a participant, either directly or through one or more agents. This embodiment may also be publicized to encourage participation, while the initiator(s) maintain control (for example, a person who wishes to join the application may need to apply for access). In another embodiment, all, or any subset, of these different set-ups are implemented. Similarly, the system may permit one or more participants to police the application by removing a participant from the application altogether.

In a further, more general, embodiment, different participants in a distributed application have different levels of privileges within the application. One example of this is, as above, where some participant(s) may have the privilege of controlling participation in the application. Another example is where participants have the privilege to edit or delete their own information inputs, and perhaps one participant or a particular group of "super-participants" has the privilege level to be able to edit or delete others' information inputs (an example of this might be a moderated discussion group). In a particular embodiment, the (group of) participant(s) who initiate the application is vested with the power to grant or deny privileges to other participants. In any such embodiment, the central agent has the capability of differentiating among different privilege levels of the various participants in an application.

Figure 3A:
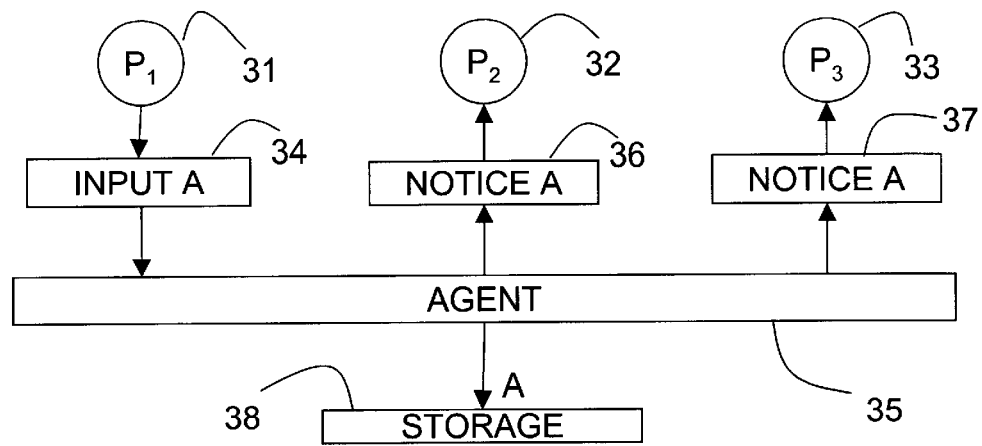
FIGS. 3-A to 3-C show flow charts for the asynchronous events in a responsive, rapid interaction among three individual members of a group.
Figure 3B:
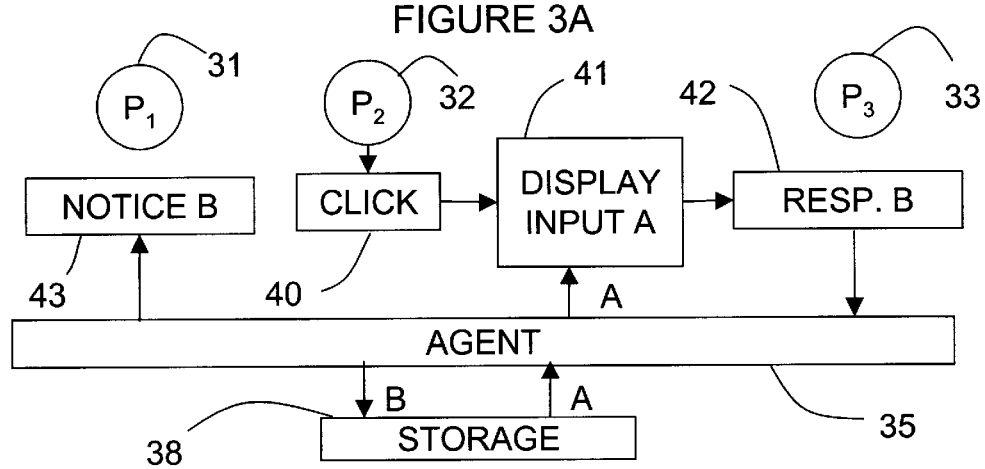
Figure 3C:
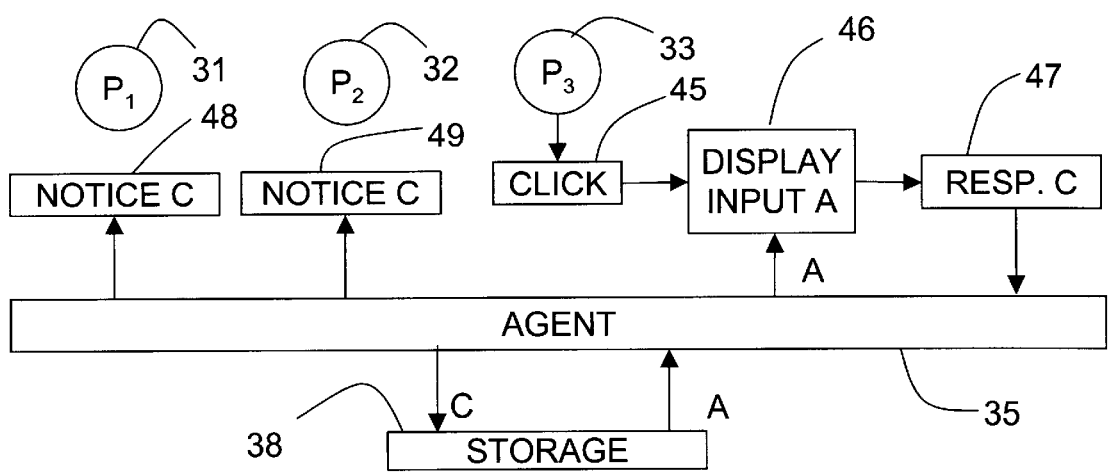
Figure 4A:
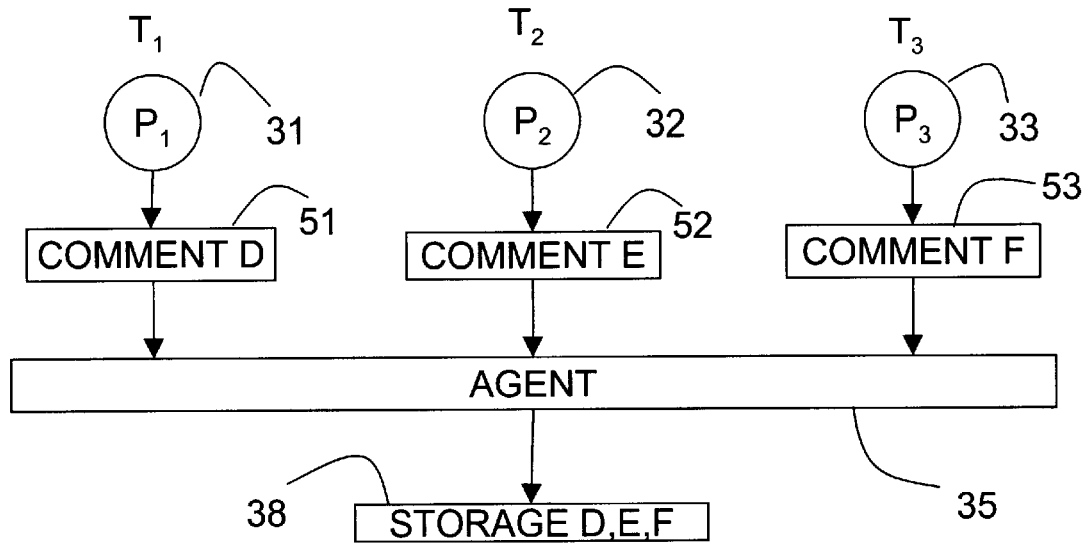
FIGS. 4-A and 4-B show flow charts for the events in a slower interaction among three individual members of a group.
Figure 4B:
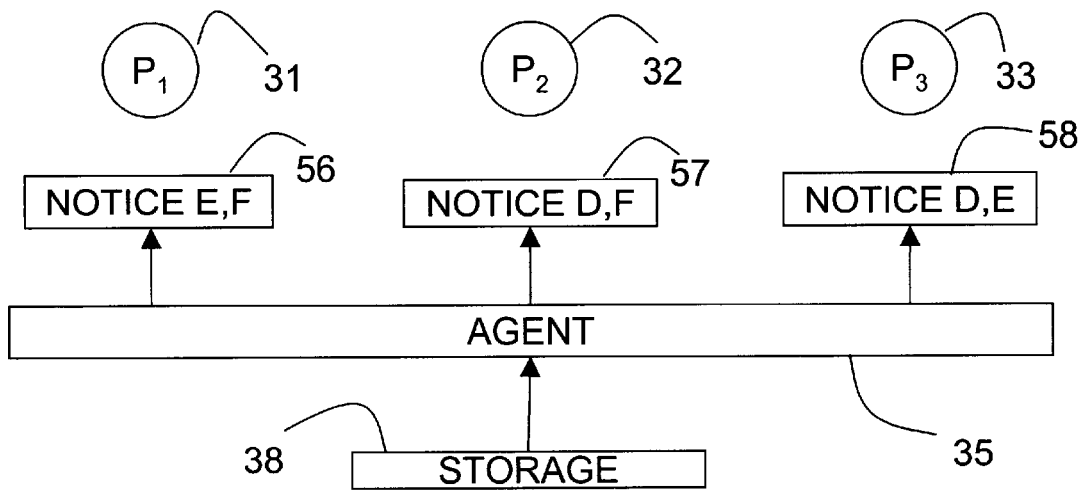

FIGS. 3 and 4 depict an e-mail driven embodiment of a distributed discussion group according to an embodiment of the invention. FIGS. 3-A to 3-C represent a responsive continuous interaction among three individual members of a group. Although the events are asynchronous, they may be relatively rapid. Throughout, the agent 35 identifies and pushes the appropriate URLs to the appropriate people. In FIG. 3-A, member Person 1, identified as circle 31, initiates a session by providing an initial input A in a peripheral device such as a personal computer, as identified by box 34. In this example, input A is a question for members Person 2, identified as 32, and Person 3, identified as 33. The question could be "What is the status of Project X?" Agent 35 receives input A from member Person 1, selects the members to whom the input is relevant, in this case Person 2 and Person 3, and pushes and posts notice of activity with, for example, a hyperlink at the peripheral computers 36 and 37 for members Person 2 and Person 3. In addition, the agent 35 stores input A in central storage 38 as record A.

In FIG. 3-B, member Person 2 (box 32) receives notice A 36 as in the previous figure, and responds by clicking the hyperlink, box 40. This brings input A directly to member Person 2 from storage 38, and displays the question "What is the status of Project X?" as shown in box 41. Member Person 2 provides a status report to Person 1, which may include text, graphics, video, and audio, and inputs the report as input Response B, shown as box 42. Agent 35 selects Person 1 as the relevant member, pushes and posts notice B with hyperlink shown as box 43 on the peripheral device of Person 1, and stores input B as record B in central storage 38.

In FIG. 3-C, member Person 3 provides a response and comment directed to both of the other members. Person 3 responds to notice A by clicking the hyperlink, box 45. This brings input A directly to Person 3 from the central database, and displays the question "What is the status of Project X?" as shown in box 46. Member Person 3 provides a different status report, input C, and directed to both members Person 1 and Person 2, shown as box 47. Agent 35 selects members Person 1 and Person 2 as the relevant members, pushes and posts notice C with hyperlink shown as box 48 and 49 on the peripheral device of Person 1 and Person 2, and stores input C as a record in central storage 38.

FIGS. 4-A and 4-B show flow charts for a more extended asynchronous interaction among three individual members of a group with a periodic push setting. In FIG. 4-A, at time $T_1$, member Person 1 submits input comment D, shown as box 51. At time $T_2$, Person 2 submits input comment E, shown as box 52. At time $T_3$, Person 3 submits input comment F, shown as box 53. Each of inputs D, E, and F is intended for each of the other group members. As each of the inputs is received, agent 35 selects the intended recipients and stores the inputs in central storage 38 as records D, E, and F for periodic push and notification. The push period can be any desirable period, such as hourly, daily, or weekly. In some applications the push period may be minutes, seconds, or less.

In FIG. 4-B, after the elapsed predetermined period, at time $T_4$ (not shown in the figure), such as the next day if the system is set for daily notification, agent 35 pushes and posts individualized notices at the peripheral devices of the members. Members do not receive notices of their own inputs. Notice 56 for Person 1 refers to inputs E and F by Persons 2 and 3. Notice 57 for Person 2 refers to inputs D and F by Persons 1 and 3. Notice 58 for Person 3 refers to inputs D and E by Persons 1 and 2. If there are eight members of the group in this example, members 4–8 receive no notification, assuming they were not designated to receive any of the input comments D, E, and F. Thus, in this approach, members 1–3 are notified that there is information and are provided with a direct link to the central database to retrieve it. Other members do not need to take any action because there is no relevant new information for them, and they know that by the absence of a notice. In addition, the members for whom there is relevant information are not burdened by a constant flow of information, as with, for example, a list-server, and are shown only information relevant to them.

In the examples shown in FIGS. 3A–C and 4A–B, as discussed above, asynchronous operation may occur. It should be noted that asynchronous operation may be combined with real-time operation, for example, to result in instant notification of an information input. That is, notices of information inputs may be pushed to participants upon the reception of such information inputs at the central agent.

Figure 5:
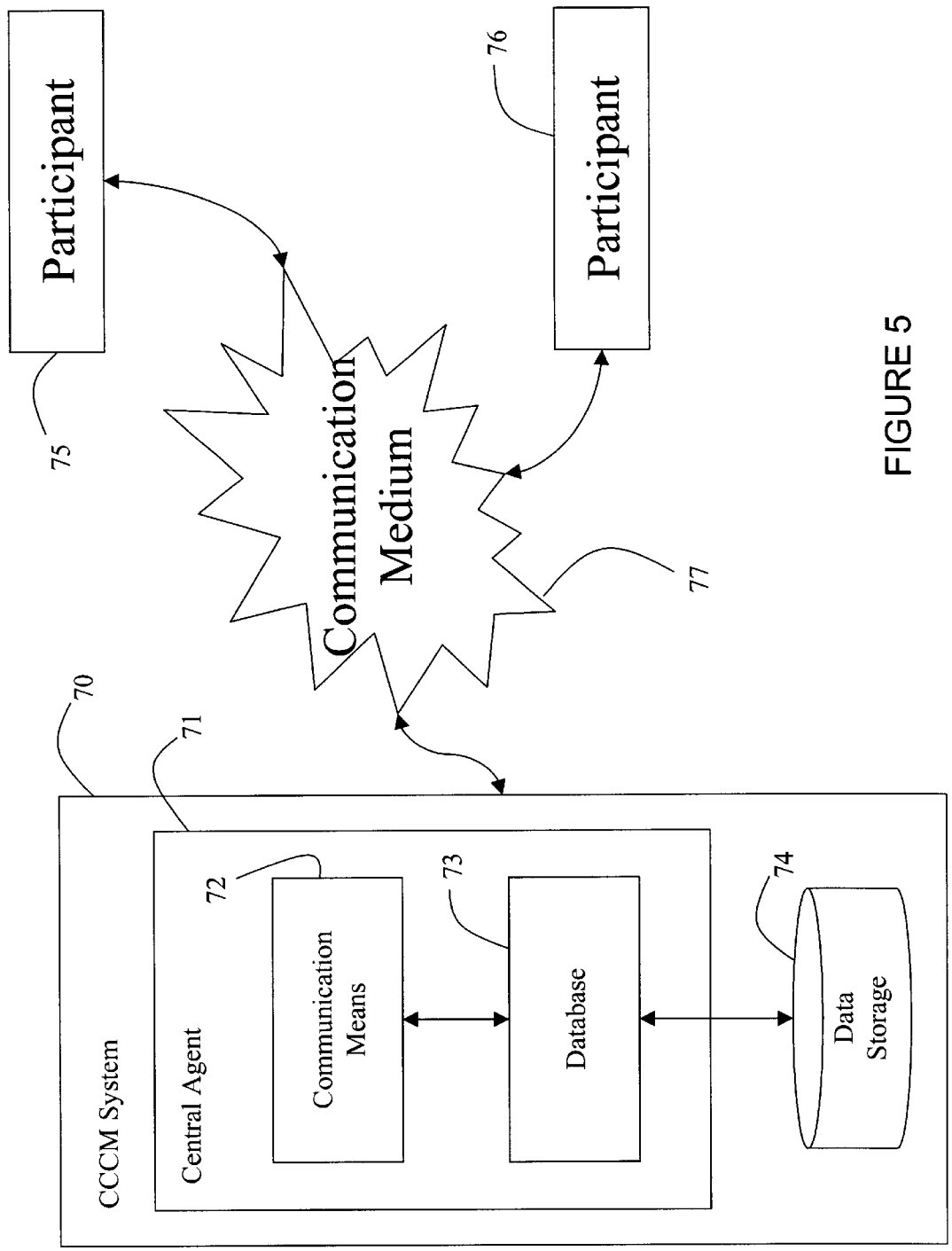
FIG. 5 depicts a general framework of an embodiment of the invention.

FIG. 5 shows a basic framework according to an exemplary embodiment of the invention. Shown are two participant sites 75 and 76; there may be more than two, as well. Participants 75 and 76 communicate, via a communication medium 77, with the central CCCM system 70. The central CCCM system comprises a central agent 71. The central agent comprises, at least, communication means 72 and database 73, which may be embodied as a relational database, an object-relational database, a flat-file database, or any other database system. CCCM system 70 further comprises data storage, which may comprise any computer-readable medium.

In a preferred embodiment of the invention data corresponding to distributed applications involving multiple participants, e.g., 75 and 76, is stored in data storage 74. Database 73 is set up so as to permit access to the records stored in data storage 74 as follows. A participant, say, 75, follows a channel to obtain a record stored in data storage 74. The channel is contained in a notice (e.g., an e-mail message) generated by the communication means 72. The channel leads to a specific record in database 73, which, in turn, points to the applicable record stored in data storage 74. A record in database 73 may also point to more than one stored record, for example, in a case in which the CCCM system informs the participant that there are several pieces of information intended for him/her; such a scenario may arise, for example, in the case in which a given user is a participant in more than one application or if several new pieces of information are present in a single application in which he/she is a participant. Following the channel would permit the participant to access any or all of the stored information records, in one or more applications, as desired by the participant. In one embodiment of the invention, the channel takes the participant to a list of his/her various applications or to such a list containing only those for which there is new information to be accessed.

The notice transmitted by communication means 72 may further contain information or flags relating to levels of urgency associated with the (various pieces of) information about which the notice is being sent; indication as to whether or not action is required; and the like.

Communication means 72 facilitates communication, via communication medium 77, with participants 75 and 76. Communication means 72 may include one or more mail servers, HTTP servers, narrowcasting means, broadcasting means, etc., according to the nature of communication medium 77. Furthermore, communication medium 77 may comprise more than one communication medium. For example, CCCM system 70 could transmit information to participants 75 and 76 via radio and could receive information from participants 75 and 76 via the Internet.

Figure 6:
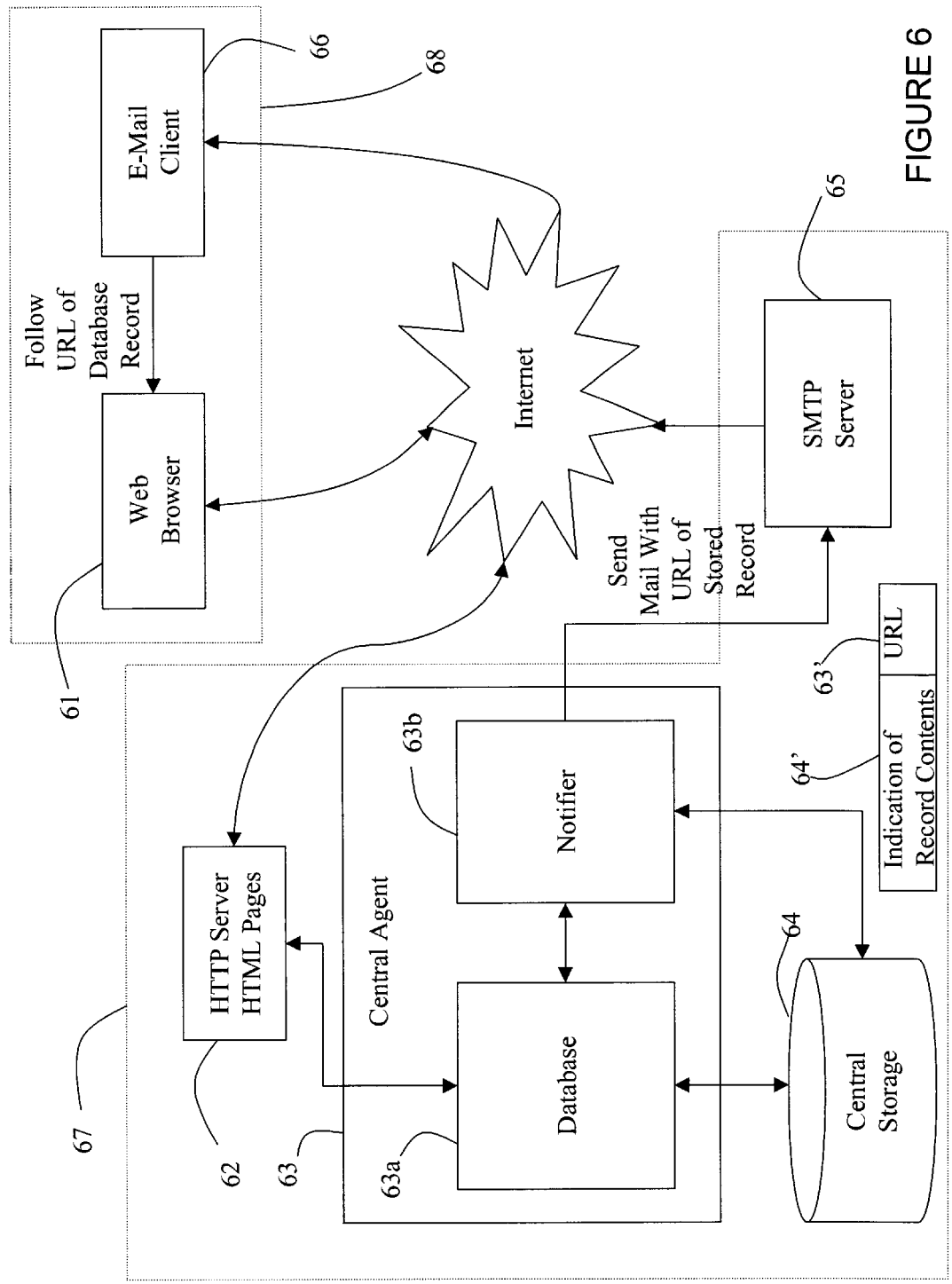
FIG. 6 is a flow chart of information flow in a system according to the invention.

FIG. 6 shows an exemplary embodiment of a software structure of the inventive system. In particular, there are three primary components to the system in the embodiment shown: central site 67, participant site 68, and a communication network, exemplified by the Internet in FIG. 6. Central site 67 includes implementations of HTTP server 62 (which may comprise plural HTTP servers), central agent 63, and an SMTP server 65, as well as including central storage 64. This embodiment uses SMTP engine 65 of a mail server as the notice sender to perform an e-mail push. Central agent 63 includes a database 63a (which may be a relational database, an object-relational database, a flat-file database, or any other kind of database) and a notifier 63b. Centrifugal access programming for central agent 63 may be written according to conventional programming principles, and may be provided by a "middleware" product such as Radnet's Webshare (Cambridge, Mass.), Allaire's ColdFusion (Cambridge, Mass.), SilverStream's Web Application Platform (Irvine Calif.), or BlueStone's Sapphire/Web (Mount Laurel, N.J.); such programming implements database 63a and notifier 63b. A given participant site 68 includes implementations of web browser 61 and e-mail client 66.

Suppose, for example, that a given participant, at participant site 68, receives notification that there is information for him/her stored in central storage 64. In an exemplary embodiment of the invention, this notification has the form of a description of or short portion of the information and a channel, which for the purposes of this exemplary embodiment, is a URL. If the participant elects to access the stored information, he/she clicks on the URL, and Internet-connected web browser 61 accesses HTTP server 62 and is allowed, by means of database 63a of central agent 63, to access central storage 64 to obtain a record of information in, for example, a multi-participant discussion group. The database 63a retrieves the record from central storage 64 and presents it in HTML format to HTTP server 62, which, in turn, transmits it through the Internet to the participant's web browser 61.

If the user clicks to respond to the information he/she has received from central storage 64, and to notify the author who made the previous comment of this new response, the mail sent to notify this previous author must contain a URL 63' corresponding to the actual stored record corresponding to the response. The mail also contains some indication 64' of the content of the response. Upon reading the e-mail in 66, following or clicking on the URL 63' will retrieve the stored response record automatically from the central storage 64, after clearing applicable authentication procedures such as password clearance.

In a similar fashion, if software agent 63 were running overnight counting a user's number of unread messages in a bulletin board-style Web discussion from central storage 64, the agent's 63 e-mail report to the user 66 would contain a URL of a database record that corresponds to one or more of the unread messages. The e-mail report would also contain indicia 64' of the contents of the unread messages. This would permit the recipient to follow or click on the URL to retrieve one or more of the unread message records automatically from central storage 64 after clearing any authentication procedures.

In the embodiment of FIG. 6, the interface between HTTP server 62 and central agent 63 may utilize one or more of the following: CGI (Common Gateway Interface); ISAPI (Internet Server Application Programming Interface (by Microsoft)), and NSAPI (Netscape Server Application Programming Interface). These are not the sole options for this software interface, but they are merely indicative of a particular implementation of the invention.

In a variation on the embodiments of FIGS. 5 and 6, the central agent and/or the central storage are collocated at single participant site.

Figure 7:
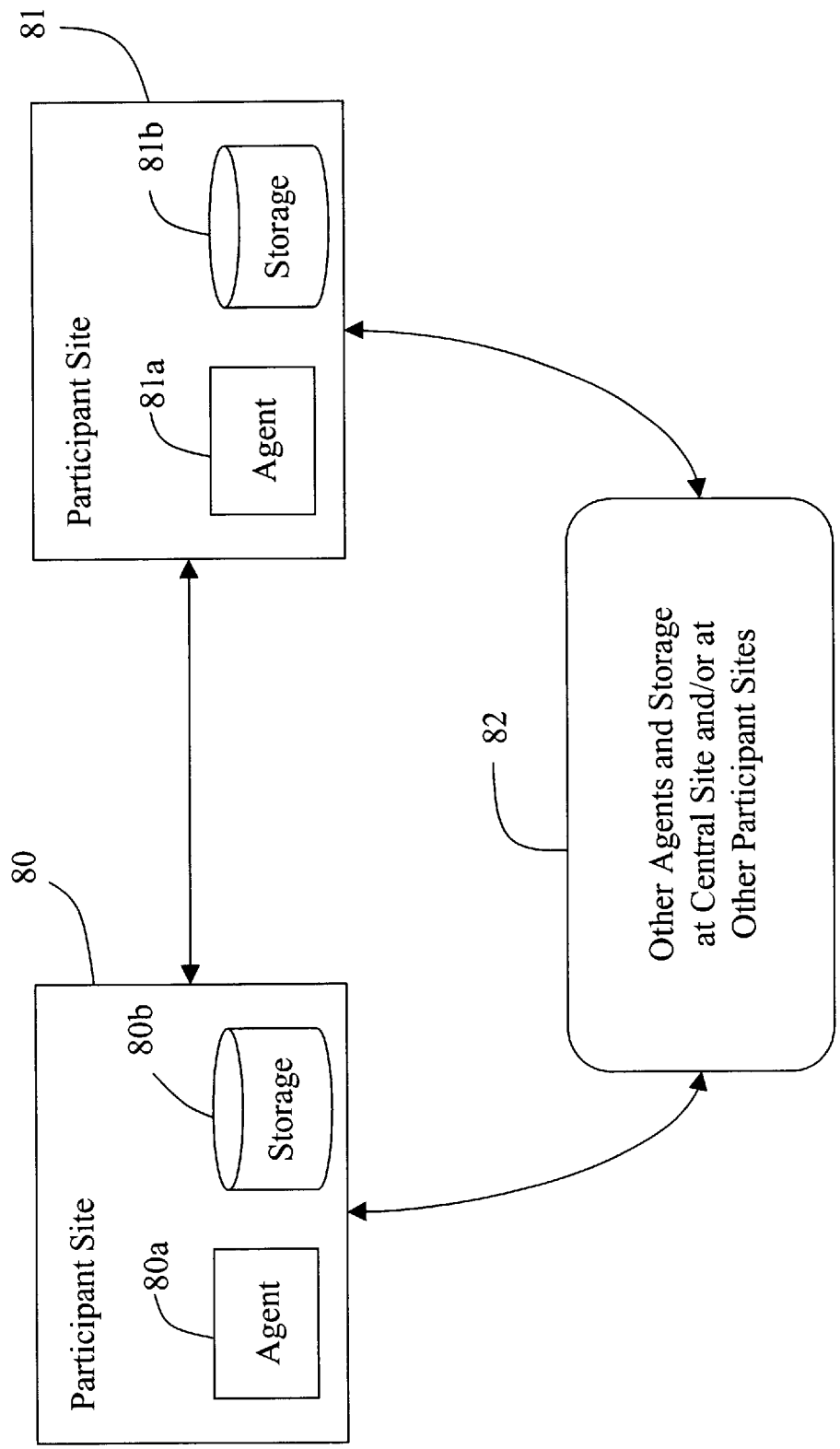
FIG. 7 depicts a distributed implementation of CCCM according to an embodiment of the invention.

While FIGS. 5 and 6 depict the CCCM system in a centralized form, it is not necessarily the case that it is centralized. FIG. 7 depicts a scenario in which a CCCM system is implemented in distributed or semi-distributed form. As shown in FIG. 7, the central agent and the central storage may be implemented in a distributed fashion, at two or more participant sites, e.g., 80 and 81; such distributed implementations are shown as blocks 80a, 80b, 81a, and 81b. The CCCM system may also have some of its functionality implemented in a centralized fashion, as shown in block 82.

In a distributed implementation, information destined for a given participant, say participant 80, may be stored in storage 80b, storage 81b, or other storage facilities in the system. Suppose that participant 80 receives a message indicating that there is new information for his/her attention. Participant 80 then utilizes a channel included in the message to access an agent site, which may be 80a, 81a, or some other site (82), depending on the implementation. The agent site then performs the previously-described functions; however, if central storage is distributed, the database record accessed at the agent site will point to one or more different storage facilities. Access to remotely located storage facilities may be by direct access by the agent, or it may be by indirect access, through a remotely located agent (e.g., one collocated with the storage facility containing the desired information). Such a remotely located agent would contain a database record pointing to the desired information.

While the distributed schemes discussed above illustrate distribution of the central agent and/or the central storage among the participant sites, they may also be implemented in a distributed fashion at non-participant sites. For example, in one embodiment, there are regional sites covering different geographic regions. The implementation may also be on a number of sites including both participant sites and non-participant sites.

In such distributed scenarios, the maintenance of up-to-date information in the various portions of the CCCM system is an important consideration. In particular, a given piece of information may be stored in more than one location. In a preferred embodiment of the invention, information inputs stored in more than one location are synchronized with each other, either directly or via a central device. Such data synchronization may be done periodically or in real time, and it may be accomplished using any appropriate data synchronization technique.

It is apparent from these examples that the agent is interposed between the participants and the central storage, in contrast with conventional centripetal methods of collaboration. As a result the central storage need not be complete. Indeed, once an input has been pushed to all intended recipients, the storage could be purged, although in practice it may be preferable to keep a backup record of transactions in the group for at least a predetermined period (e.g., one month).

Figure 8:
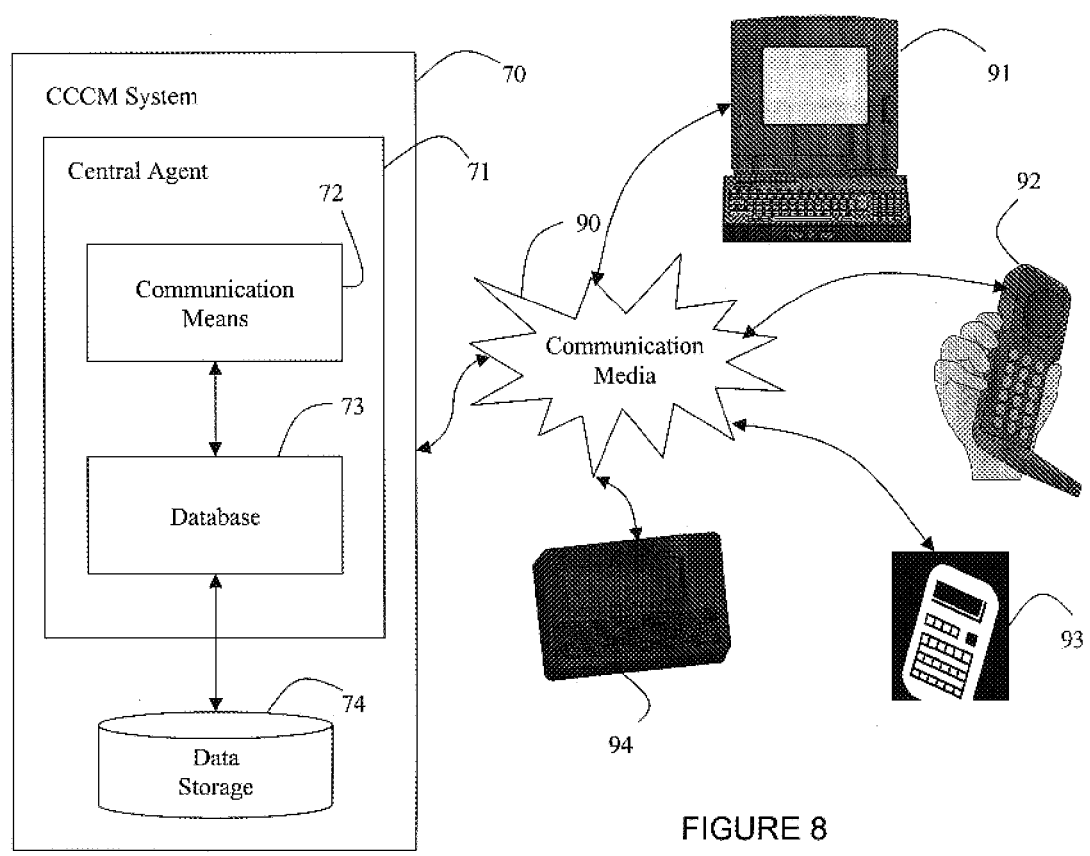
FIG. 8 depicts an embodiment of the invention in which various devices are used by various participants.

FIG. 8 depicts another embodiment of the invention. In this embodiment, different devices 91–94 are used to interact with CCCM system 70 via one or more communication media 90. To accommodate such diverse devices, central agent 71 is implemented such that it is capable of manipulating the information to be sent to such a device according to the capabilities and capacities of the device. Suppose, for example, that a particular participant wishes to access a particular information record that contains graphics. If the participant is using, for example, a graphics-capable computer 91, central agent 71 will transmit the graphics. However, should the participant be using a device only capable of alphanumeric display, central agent 71 will either not send the graphical portion of the information or will adapt it for alphanumeric display. Similar manipulation may be performed for audio, alphanumerics, or other information, according to the participant's particular device. In a preferred embodiment of the invention, such manipulation is performed automatically by central agent 71; however, in another embodiment, central agent 71 is implemented so as to permit participants to select data formats, as desired, in addition to or instead of the manipulation being performed automatically.

Similarly, in a case where multiple communication media 90 are capable of being used, central agent 71 is implemented such that it is capable of manipulating the information to accommodate the capabilities and capacity of each particular medium. For example, different computer networks may be used, each having a different capacity (bit rate). Central agent 71 is able to manipulate the information to be transferred over each network such that the information is transmitted at the capacity of the network. This may amount, for example, to transmitting at different bit rates on different networks or to transmitting only some (most significant) portion of the information.

In a list-server, participants sign up to join the group independently and can remove themselves at will. Thus, no member can control the presence of the others. The list is formed individually by the sign up of each recipient. According to a preferred embodiment of the invention, in contrast, each participant can push a notice to any other person available on the Internet via an e-mail message, to select an individualized and personalized group without requiring routing through a central list-server. Moreover, the central storage according to the invention can be used to provide a threaded and scrollable record of relevant inputs, as opposed to the excessive number of individual e-mail messages in a list-server, which are not threaded or scrollable. Also, list servers generally do not use a database. A distinctive aspect of the invention is "pushing" the URL (or retrievable handle) of a database record that needs to be seen in order to present stored information to the user.

According to the invention, the pattern of pushing that is done may depend on any or all of the following factors:

(1) the list of people identified by the inputting person;
(2) if the people identified are not already members of the group, whether they join the group;
(3) whether there has been new activity relevant to a particular member;
(4) whether there has been a response to a particular input;
(5) a predetermined update frequency.

In one preferred commercially viable embodiment, a hypothetical group application includes participants 1, 2, 3 . . . n at n different locations. Each is given an e-mail notice of a group meeting, either asynchronous or scheduled at a particular time. At that time, or individually, they each re-open the e-mail message and follow a hyperlink that fires up a web browser and takes them directly to an e-meeting center, in this case a web page where they may converge. They provide passwords, if they have not already done so, and join.

For an on-demand conference, participants can read and post messages, read and post files, and publish and attend presentations and lectures. For a live conference, participants communicate and collaborate interactively in real time via video, audio, screen sharing, chat, whiteboard, and so on.

Several of the embodiments described above describe the use of URLs as the channels sent as part of notifications; however, other types of channels may be used. For example, in computer applications, the channel may also take the form of a micro- or nano-http (web) server or a network socket connection. In other applications, the channel may take other forms, for example, a telephone call in an audio-based application (e.g., via telephone or wireless voice networks). To summarize, the channel may be any channel that can be used with the particular communication medium (or media) being use, and which is compatible with the application.

The embodiments illustrated and discussed in this specification are intended only to teach those skilled in the art the best way known to the inventors to make and use the invention. Nothing in this specification should be considered as limiting the scope of the present invention. Modifications and variations of the above-described embodiments of the invention are possible without departing from the invention, as appreciated by those skilled in the art in light of the above teachings. It is therefore to be understood that, within the scope of the claims and their equivalents, the invention may be practiced otherwise than as specifically described.

What is claimed is:

1. A system for communicating information among participants in a distributed application comprising:
   for each participant, a peripheral device capable of transmitting and receiving information; and
   a central agent comprising:
      two-way links to the peripheral devices capable of receiving and transmitting information,
      a notice generator,
      a notice sender, and
      a central storage medium able to store information inputs from participants,
   the central storage medium storing a first information input from an inputting participant directed to at least one receiving participant; the notice generator, responsive to said first information input, being able to generate a notice selectively for the at least one receiving participant and to push the notice to the notice sender, the notice comprising a channel to a memory location of said first information input in the central storage medium; and the notice sender, responsive to the notice pushed from the notice generator, being able to send the notice selectively to the peripheral devices of the receiving participant; whereby the receiving participant can access said first information input directly using the channel in the pushed notice; the central storage medium being further able to store a second information input from a participant in response to said first information input and to associate it with said first information input while subsequently retaining said first information input or modifying or deleting said first information input in accordance with said second information input; the notice generator, responsive to said second information input, being able to generate a second notice selectively directed to at least one other participant in said distributed application, which at least one other participant may or may not include said inputting participant, the second notice comprising a channel to a memory location of said second information input in the central storage medium, and said second notice being pushed to said notice sender; said notice sender, responsive to said second notice being pushed, being capable of sending said second notice to the peripheral devices of the at least one participant to whom the second notice is selectively directed; and the central storage medium being further able to store a third information input from a participant in response to said second information input and associate it with said first and second information inputs while subsequently retaining said first and second information inputs or modifying or deleting one or both of said first and second information inputs in accordance with said third information input.

2. The system according to claim 1, wherein said links form at least one of a computer network, a cable network, a wireless network, a television network, a telephone network, and a radio network.

3. The system according to claim 1, wherein said links form a combination of at least two of the following: a computer network, a cable network, a wireless network, a television network, a telephone network, and a radio network.

4. The system according to claim 1, wherein said central agent comprises:
   at least two distributed central agent components, in at least two locations.

5. The system according to claim 4, wherein at least one of said at least two distributed central agent components is located at a participant site.

6. The system according to claim 4, wherein at least one of said at least two distributed central agent components is located at a facility other than a participant site.

7. The system according to claim 1, wherein said central storage medium comprises:
   at least two distributed central storage medium components, in at least two locations.

8. The system according to claim 7, wherein at least one of said at least two distributed central storage medium components is located at a participant site.

9. The system according to claim 7, wherein at least one of said at least two distributed central storage medium components is located at a facility other than a participant site.

10. The system according to claim 1, wherein said central agent is located on a participant's peripheral device.

11. The system according to claim 1, further comprising:
    means for synchronizing information inputs stored on more than one device.

12. The system according to claim 11, wherein said means for synchronizing performs data synchronization on a periodic basis.

13. The system according to claim 11, wherein said means for synchronizing performs data synchronization on a real-time basis when a device is activated.

14. The system according to claim 1, wherein said central agent further comprises:
means for manipulating information inputs to accommodate particular capabilities and capacities of a particular participant's peripheral device.

15. The system according to claim 14, wherein said means for manipulating information inputs includes:
means for manipulating information inputs to provide such information inputs in a format chosen by a particular participant.

16. The system according to claim 1, wherein said central agent further comprises:
means for manipulating information inputs to accommodate the particular capabilities and capacities of one or more communication networks servicing said participants.

17. The system according to claim 1, wherein the central agent further comprises:
means for selectively permitting one or more activities to a given participant based on a privilege level assigned to the given participant.

18. The system according to claim 17, wherein said activities include at least one of posting information inputs, receiving information inputs, editing other participants' information inputs, deleting other users' information inputs, and removing a participant from participating in said distributed application.

19. The system according to claim 1, wherein said distributed application comprises one or more of the following: a distributed discussion group, a distributed scheduling application, a distributed contact management application, a distributed document management application, and a distributed project management application.

20. The system according to claim 1, wherein said central agent further comprises:
a database, connected to said two-way links, to said central storage medium and to said notice generator.

21. The system according to claim 20, wherein said database comprises one of a relational database, an object-relational database and a flat-file database.

22. A method of communicating information among participants in a distributed application having peripheral devices capable of transmitting and receiving information, comprising:
providing a central device capable of receiving information from the peripheral devices and transmitting information to the peripheral devices,
linking the central device to the peripheral devices,
responsive to a first information input transmitted from the peripheral device of a first participant directed to at least one other participant,
centrally receiving and storing the first information input,
associating the first information input with the at least one other participant,
preparing a notice of the first information input for the at least one other participant, the notice comprising a channel to a memory location of the first information input, and
sending the notice to the peripheral device of the at least one other participant only if the at least one other participant is one to whom the associated information input is directed,
responsive to a second information input by the at least one other participant, in response to said notice,
centrally receiving, storing, and associating the second information input with the first information input, while retaining the first information input or modifying or deleting the first information input in accordance with the second information input,
preparing a second notice of the second information input directed to at least one other participant, which may or may not include said first participant, the second notice comprising a channel to a memory location of the second information input, and
sending the notice to the peripheral device of the at least one other participant only if the at least one other participant is one to whom the associated information input is directed, and
responsive to a third information input by the at least one other participant to whom said second notice was directed and in response to said second notice,
centrally receiving, storing, and associating the third information input with the first and second information inputs, while retaining the first and second information inputs or modifying or deleting one or both of the first and second information inputs in accordance with the third information input,
preparing a third notice of the third information input directed to at least one other participant, the third notice comprising a channel to a memory location of the third information input, and
sending the third notice to the peripheral device of the at least one other participant only if the at least one other participant is one to whom the associated information input is directed.

23. The method according to claim 22, wherein at least one participant is a participant in multiple distributed applications, and wherein each of said steps of preparing that prepares a notice to said at least one participant in multiple distributed applications comprises the step of:
including in said notice any notices to the at least one participant in multiple distributed applications relating to any of said multiple distributed applications.

24. The method according to claim 23, wherein the notice generated by said step of including includes a single channel specific to the participant receiving the notice.

25. The method according to claim 24, further comprising the step of:
activating, by said receiving participant, the channel included in said notice, said channel linking said receiving participant to a list of various applications in which he or she is a participant, the entries in the list corresponding to any of said multiple distributed applications for which a notice to said receiving participant was included in the notice prepared in whichever preparing step comprises the step of including.

26. The method according to claim 25, further comprising the step of:
using said list of various applications to receive information inputs destined for said receiving participant.

27. The method according to claim 22, each of said steps of preparing comprising the step of:
including in said notice information describing the content of the information input whose presence is being announced by the notice.

28. The method according to claim 27, wherein each of said steps of preparing further comprises the step of:

including, in addition to said information describing the content, additional information about said information input.

29. The method according to claim 28, wherein said additional information includes at least one of an indication of a level of urgency and an indication as to whether or not action is required by a participant receiving the notice.

30. The method according to claim 22, wherein said step of linking comprises the step of:
using at least one of a computer network, a cable network, a telecommunications network, a wireless network, a radio network, a telephone network, and a combination of networks to link the central device and the peripheral devices.

31. The method according to claim 22, wherein said step of providing a central device comprises the step of:
deploying a central device having at least one component collocated with at least one of said peripheral devices.

32. The method according to claim 22, wherein said step of providing a central device comprises the step of:
deploying a central device, all of whose components are collocated with at least one of said peripheral devices.

33. The method according to claim 22, wherein said step of providing a central device comprises the step of:
deploying software implementing a central device on one of said peripheral devices.

34. The method according to claim 22, wherein said step of providing a central device comprises the step of:
deploying components of a central device in multiple locations not collocated with any of said peripheral devices.

35. The method according to claim 22, further comprising the step of:
periodically synchronizing information inputs stored on at least two devices, wherein said devices include the central device and the peripheral devices.

36. The method according to claim 22, further comprising the step of:
synchronizing information inputs stored on at least two devices in real time, upon start-up of one of the at least two devices, wherein said devices include the central device and the peripheral devices.

37. The method according to claim 22, further comprising the step of:
allowing a non-participant in the distributed application to become a participant in the distributed application.

38. The method according to claim 37, wherein the step of allowing a non-participant to become a participant comprises the steps of:
permitting public access to the distributed application; and
publicizing the distributed application.

39. The method according to claim 37, wherein said step of allowing a non-participant to become a participant comprises the step of:
inviting a non-participant to participate in the distributed application.

40. The method according to claim 39, wherein said step of inviting is performed by any participant in the distributed application.

41. The method according to claim 39, wherein said step of inviting includes the step of:
authorizing the invitation of a non-participant to become a participant.

42. The method according to claim 41, wherein said step of authorization can only be performed by a subset of the participants, the subset being less than all participants.

43. The method according to claim 42, wherein said subset of the participants comprises an initiating participant and a group of other participants including agents of an initiating participant and any other participants authorized by an initiating participant to authorize invitation.

44. The method according to claim 42, wherein said subset of the participants comprises one or more initiating participants, only.

45. The method according to claim 22, further comprising the step of:
manipulating, by the central device, one or more information inputs to accommodate particular capabilities and capacities of a particular participant's peripheral device.

46. The method according to claim 22, further comprising the step of:
manipulating, by the central device, one or more information inputs to provide the one or more information inputs in a format chosen by a particular participant.

47. The method according to claim 22, further comprising the step of:
manipulating, by the central device, one or more information inputs to accommodate particular capabilities and capacities of one or more communication networks servicing said participants.

48. The method according to claim 22, further comprising the step of:
differentiating, by the central device, among activities permissible and not permissible to a given participant based on a privilege level assigned to that participant, thus permitting the participant to engage in the permissible activities and not in those that are not permissible.

49. The method according to claim 48, wherein said activities include at least one of posting information inputs, receiving information inputs, editing other participants' information inputs, deleting other users' information inputs, and removing a participant from participating in said distributed application.

50. The method according to claim 22, wherein said distributed application comprises one or more of the following: a distributed discussion group, a distributed scheduling application, a distributed contact management application, a distributed document management application, and a distributed project management application.

51. The method according to claim 22, wherein notices are sent asynchronously and in real time, upon receipt of corresponding information inputs.

52. A system for communicating information among participants in a distributed application having peripheral devices capable of transmitting and receiving information, comprising:
means for centrally receiving a first information input transmitted from the peripheral device of a participant directed to at least one other participant;
means for generating a notice of the first information input, the notice comprising a channel linking the at least one other participant to the first information input;
means for sending the notice to the peripheral device of the at least one other participant selectively if the participant is one to whom the associated information input was directed, and
means for centrally storing the first information input such that when the at least one other participant receives the notice, the at least one other participant can retrieve the first information input at the respective peripheral device via the channel, and can transmit to the central receiving means at least one response to the first information input, the central receiving means comprising means for associating the first information input with the at least one response, said means for associating being capable of modifying or deleting the first information input if indicated by the at least one response, said means for generating a notice generating, responsive to said at least one response, at least one second notice directed to at least one participant other than the participant sending the particular response, said notice containing at least one channel linking the at least one other participant to said at least one response, and said means for sending sending the at least one second notice to the peripheral device of the at least one participant to whom it is directed, said means for centrally storing providing the at least one other participant the capability of retrieving the at least one response at the respective peripheral device via the at least one channel, and further associating with said first information input and said at least one response any further responses from said at least one other participant to said at least one response or modifying or deleting one or both of said first information input and said at least one response if indicated in a further response.

53. A system for communicating information among members of a distributed application comprising:

for each participant, a peripheral device capable of transmitting and receiving information; and a central agent comprising:
two-way links to the peripheral devices capable of receiving and transmitting information,
a notice generator,
a notice sender, and
a central storage medium able to store information inputs from participants, the central storage medium storing a first information input from a first participant directed to at least one other participant; the notice generator, responsive to said first information input, being able to generate a notice selectively for the at least one other participant and to push the notice to the notice sender, the notice comprising a channel leading to a memory location of said first information input in the central storage medium, said channel containing all information necessary to automatically access said first information input, including authentication information containing a password; and the notice sender, responsive to the notice pushed from the notice generator, being able to send the notice selectively to the peripheral devices of the at least one other participant; whereby the at least one other participant can access said first information input directly and automatically using the channel in the pushed notice; the central storage medium being further able to store a second information input from a participant in response to said first information input and associate it with said first information input while subsequently retaining said first information input or modifying or deleting said first information input in accordance with said second information input.

54. A method of communicating information among participants in a distributed application, said participants having peripheral devices capable of transmitting and receiving information, the method comprising the steps of:

providing a central device capable of receiving information from the peripheral devices and transmitting information to the peripheral devices, linking the central device to the peripheral devices, responsive to a first information input transmitted from the peripheral device of a first participant in the application directed to at least one other participant in the application:
centrally receiving and storing the first information input,
associating the first information input with the at least one other participant,
preparing a notice of the first information input for the at least one other participant, the notice comprising a channel to a memory location of the first information input, said channel permitting automatic, direct access to said first information input by the at least one other participant and including such information as is needed to facilitate such automatic, direct access, including authentication information containing a password, and
sending the notice to the peripheral device of the at least one other participant only if the at least one other participant is one to whom the associated information input is directed, and responsive to a second information input by the at least one other participant, in response to said notice, centrally receiving, storing, and associating the second information input with the first information input, while retaining the first information input or modifying or deleting said first information input in accordance with said second information input.

55. A system for communicating information among participants in a distributed application, said participants having peripheral devices capable of transmitting and receiving information, the system comprising:

means for centrally receiving a first information input transmitted from the peripheral device of a participant in the application directed to at least one other participant in the application;

means for generating a notice of the first information input, the notice comprising a channel automatically and directly linking the at least one other participant to the first information input, said channel including all information necessary to provide such automatic and direct linking, including authentication information containing a password;

means for sending the notice to the peripheral device of the at least one other participant selectively if the at least one other participant is one to whom the associated information input was directed; and means for centrally storing the first information input such that when the at least one other participant receives the notice, the at least one other participant can automatically and directly retrieve the first information input at the respective peripheral device via the channel, and can transmit to the central receiving means at least one response to the first information input, the central receiving means comprising means for associating the first information input with the at least one response or modifying or deleting said first information input in accordance with the at least one response.

* * * * *